(No Model.)
M. D. FENNER.
INSULATING ELECTRIC WIRES.
No. 309,450. Patented Dec. 16, 1884.
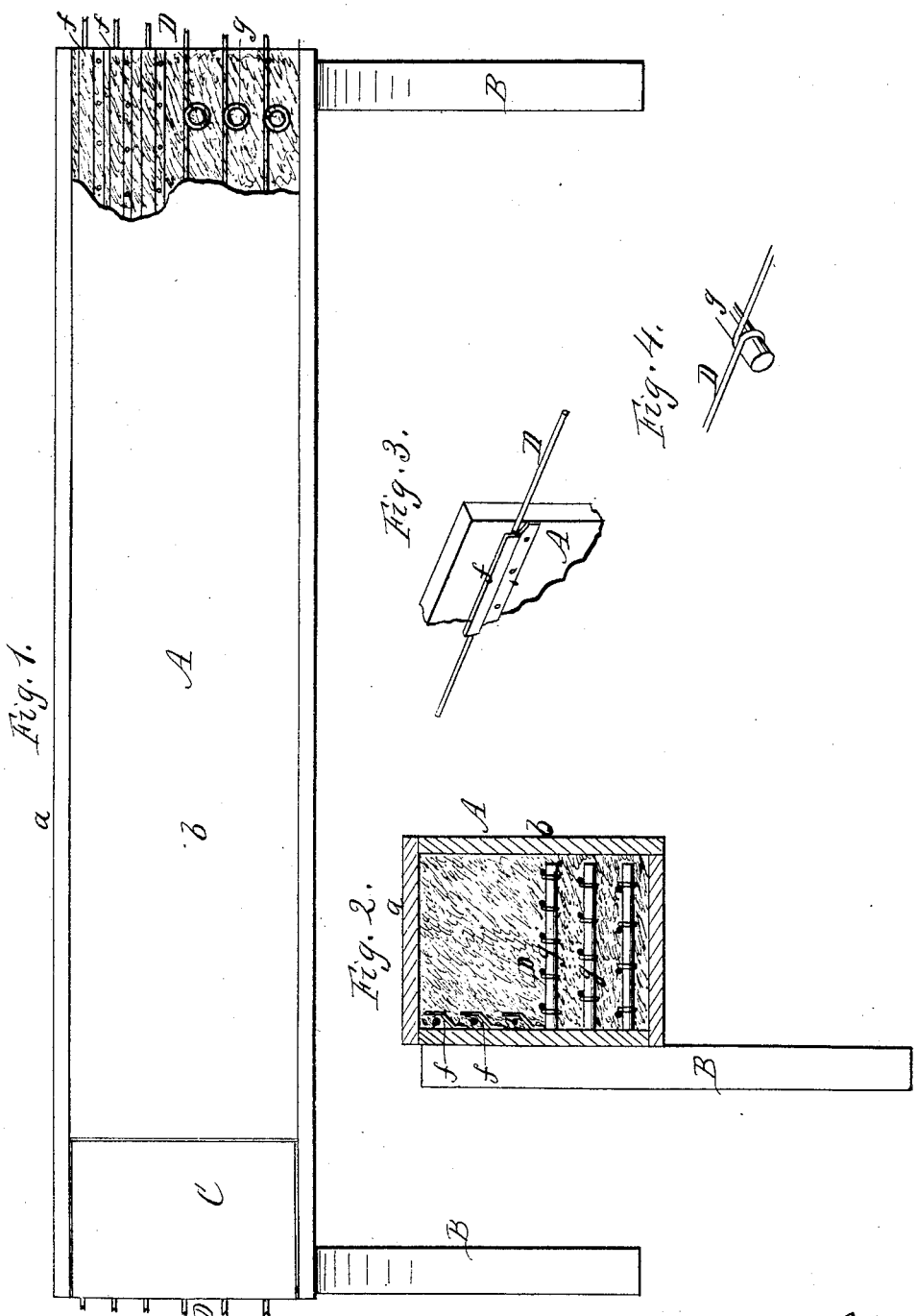
Attest
P. Hewitch
R. E. White
Inventor.
Mandana D. Fenner,
per R. F. Osgood
atty

UNITED STATES PATENT OFFICE.

MANDANA D. FENNER, OF ROCHESTER, NEW YORK.

INSULATING ELECTRIC WIRES.

SPECIFICATION forming part of Letters Patent No. 309,450, dated December 16, 1884.

Application filed January 5, 1884. (No model.)

*To all whom it may concern:*

Be it known that I, MANDANA D. FENNER, of Rochester, Monroe county, New York, have invented a certain new and useful Improvement in Insulating Electric Wires; and I do hereby declare that the following is a full, clear, and exact description of the same, reference being had to the accompanying drawings, in which—

Figure 1 is an elevation of a conduit or trough, showing my improvement. Fig. 2 is a cross-section of the same. Figs. 3 and 4 are perspective views showing the methods of holding the wires.

My improvement relates to means for insulating undergound wires, the same being laid in a conduit or trough; and it consists, in connection with the conduit or trough, of an insulating compound which covers the wires, and is composed of the following materials mixed together in the proportions substantially as named: asphaltum, eight parts, by weight; rosin, four parts, by weight; sulphur, two parts, by weight; alum, one part, by weight. These materials are melted and thoroughly mixed by stirring or agitating while in the melted state. In some instances heavy petroleum-oil, tallow, or other grease or oil is used to soften the compound. This is especially the case in cold climates; but it may or may not be used, as desired. The compound thus produced is filled into a conduit or trough which contains the wires, being inserted in the melted state, and when it cools it hardens into a solid substance which embeds the wires and produces a superior insulator. Coal-tar may be substituted in place of the asphaltum, or the two may be combined and produce the same effect, they being similar in nature. The asphaltum in this mixture produces the main body of the compound, and in itself is a good insulator. The rosin toughens and gives fiber to the asphaltum, and is also a good insulator. The sulphur hardens the mass and makes it brittle, so that it can be chipped or cut easily, and the alum tends to unite the parts, and also, to a certain degree, prevents danger from combustion. The union of these materials is such as to produce a good insulation of the wires, and such as to enable the composition to be readily cut or chipped out in inserting or removing wires or repairing the same. In its natural state the asphaltum is too tough and adhesive to be easily chipped. The sulphur hardens it, so that it becomes brittle to a considerable degree, and can be readily chipped by a proper tool. The rosin has a somewhat similar effect, and in addition it binds the asphaltum, so that it will not break too easily. This material is comparatively cheap, and can be used for filling conduits of considerable size without involving great cost.

The drawings show one method of applying my invention. A shows a conduit or trough, made of wood, plank, or any other suitable material, and attached to posts B B, the whole being sunken in the ground. The top *a* and one side, *b*, are removable for filling in the compound or reaching the wires. Doors C are also preferably made at intervals for getting access to the interior. The wires D D are passed through the conduit by extending through shallow side grooves, *f f*, made of sheet metal, or by passing around pegs *g g*, projecting from one side. The wires are separated some distance apart, so that when the material is filled in it surrounds and covers the wires in their separated condition.

To apply the material, the wires are first adjusted and the melted mass is then turned in, filling the whole passage, covering the wires, and insulating each one from the others.

To remove or repair a wire, the box is opened on one side and the material chipped away by a suitable tool.

The proportions of the materials in the compound can be varied more or less and still perform the same functions. I do not wish to confine myself to exact proportions.

Having described my invention, what I claim as new, and desire to secure by Letters Patent, is—

The means herein described for insulating electric wires, consisting of a trough, A, having one or more removable sides, supports *f g*, for holding the wires properly separated in the trough, and an insulating composition of asphaltum, rosin, sulphur, and alum melted together and poured into the trough among the wires, substantially as and for the purpose herein specified.

In witness whereof I have hereunto signed my name in the presence of two subscribing witnesses.

MANDANA D. FENNER.

Witnesses:
P. A. COSTICH,
R. F. OSGOOD.